(12) United States Patent
Sakai

(10) Patent No.: US 7,922,331 B2
(45) Date of Patent: Apr. 12, 2011

(54) POLARIZATION CONVERSION UNIT, POLARIZATION CONVERSION DEVICE, AND PROJECTOR

(75) Inventor: Yohei Sakai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 426 days.

(21) Appl. No.: 12/134,989

(22) Filed: Jun. 6, 2008

(65) Prior Publication Data

US 2009/0015794 A1 Jan. 15, 2009

(30) Foreign Application Priority Data

Jul. 11, 2007 (JP) ................... 2007-181784

(51) Int. Cl.
G03B 21/14 (2006.01)
G02B 27/28 (2006.01)
(52) U.S. Cl. ............. 353/20; 353/31; 353/34; 359/495; 359/497; 359/500; 359/634
(58) Field of Classification Search .......... 353/20, 353/31, 34, 97; 359/618, 619, 629, 633, 359/483, 485, 495, 497, 487, 627, 494, 496, 359/500
See application file for complete search history.

(56) References Cited

U.S. PATENT DOCUMENTS

| | | | |
|---|---|---|---|
| 5,986,809 A | 11/1999 | Itoh et al. | |
| 6,154,320 A | 11/2000 | Itoh et al. | |
| 6,199,987 B1 * | 3/2001 | Haba et al. | 353/34 |
| 6,312,130 B2 * | 11/2001 | Haba et al. | 353/34 |
| 6,707,516 B1 * | 3/2004 | Johnson et al. | 349/78 |
| 6,804,063 B2 * | 10/2004 | Thompson | 359/629 |
| 6,846,079 B2 | 1/2005 | Ogawa et al. | |
| RE39,951 E | 12/2007 | Itoh et al. | |
| 7,670,758 B2 * | 3/2010 | Wang et al. | 430/321 |
| 2002/0093718 A1 * | 7/2002 | Slack et al. | 359/246 |
| 2003/0025842 A1 * | 2/2003 | Saccomanno | 348/758 |
| 2004/0080834 A1 * | 4/2004 | Thompson | 359/629 |
| 2004/0114241 A1 * | 6/2004 | Sedlmayr | 359/497 |
| 2005/0018151 A1 * | 1/2005 | Kitabayashi et al. | 353/119 |
| 2005/0231690 A1 * | 10/2005 | Newell et al. | 353/20 |
| 2005/0277063 A1 * | 12/2005 | Wang et al. | 430/311 |
| 2006/0176450 A1 * | 8/2006 | Akiyama | 353/20 |
| 2007/0024974 A1 * | 2/2007 | Itoh et al. | 359/487 |
| 2007/0188714 A1 * | 8/2007 | Fuse et al. | 353/20 |
| 2008/0218697 A1 * | 9/2008 | Itoh et al. | 353/20 |
| 2009/0015794 A1 * | 1/2009 | Sakai | 353/20 |

FOREIGN PATENT DOCUMENTS

| | | |
|---|---|---|
| CN | 1196802 A | 10/1998 |
| CN | 1448756 A | 10/2003 |
| JP | 2000-81667 | 3/2000 |

(Continued)

Primary Examiner — John R Lee
(74) Attorney, Agent, or Firm — AdvantEdge Law Group, LLC

(57) ABSTRACT

A polarization conversion unit includes a polarization splitting element array including a plurality of polarization splitting films for splitting the incident light beam into two types of linearly-polarized light beams, a plurality of reflecting films for reflecting either one of the linearly-polarized light beams obtained by the polarization splitting films, and a translucent member provided with the polarization splitting films and the reflecting films, a plurality of retardation plates each formed of a quartz crystal member and for converting a polarization axis of either one of the linearly-polarized light beams obtained by the polarization splitting films into a polarization axis of the other of the linearly-polarized light beams, and a spacer member having a predetermined thickness and for bonding end sections of the retardation plates to a light beam exit side of the translucent member.

8 Claims, 9 Drawing Sheets

FOREIGN PATENT DOCUMENTS

| | | |
|---|---|---|
| JP | 2002-6281 | 1/2002 |
| JP | 2002-72162 | 3/2002 |
| JP | 2003-302523 | 10/2003 |
| JP | 2004-170677 | 6/2004 |
| JP | 2004-239948 | 8/2004 |
| JP | 2007-58018 | 3/2007 |

* cited by examiner

POLARIZATION CONVERSION UNIT, POLARIZATION CONVERSION DEVICE, AND PROJECTOR

BACKGROUND

1. Technical Field

The present invention relates to a polarization conversion unit, a polarization conversion device equipped with the polarization conversion unit, and a projector equipped with the polarization conversion device.

2. Related Art

In the past, polarization conversion devices for converting an emitted light beam into one kind of linearly polarized light beam have been used in projectors or the like for the purpose of improving the efficiency of the light beam emitted from a light source. Further, the polarization conversion device is composed of a polarization conversion unit, and the polarization conversion unit is composed of a polarization splitting element array composed including a plurality of polarization splitting films disposed obliquely to an incident light beam and for splitting the incident light beam into two kinds of linearly polarized light beams, a plurality of reflecting films disposed in parallel alternately between the polarization splitting films and for reflecting either one of the linearly polarized light beams obtained by the splitting operation of the polarization splitting films, and a translucent member provided with the polarization splitting films and the reflecting films, and a plurality of retardation plates for converting the polarization axis of either one of the linearly polarized light beams obtained by the splitting operation of the polarization splitting films into the polarization axis of the other of the linearly polarized light beams. Further, quartz is sometimes used as the retardation plates in order for enhancing the heat radiation property and so on of the retardation plates.

JP-A-2003-302523 (Patent Document 1) discloses a polarization conversion element (a polarization conversion unit), which uses a retardation plate composed of layered quartz plates, and is formed by bonding the retardation plate to the light beam exit side of the transparent member forming the polarization splitting element array using an ultra violet-curing adhesive.

However, as described in Document 1, in the case in which the retardation plate is bonded on the light beam exit side of the transparent member using the ultra violet-curing adhesive, it is difficult to adhere the light beam entrance side surface of the retardation plate and the light beam exit side surface of the transparent member (the translucent member) to each other since the surfaces of the transparent member and the retardation plate are not perfect planes, and there is caused a microscopic clearance no greater than the wavelength of the light beam between the light beam entrance side surface of the retardation plate and the light beam exit side surface of the transparent member (the translucent member). Therefore, damage to the optical characteristic such that an optical defect (such as an interference pattern) is easily caused in the projected image can be cited as a problem. Further, it can also be cited as a problem that, in the case in which the retardation plate coated with the ultra violet-curing adhesive is mounted on the light beam exit side surface of the transparent member in the manufacturing process for bonding the retardation plate with the light beam exit side of the transparent member, the retardation plate can hardly be remounted in that condition if the mounting position of the retardation plate is not appropriate for some reasons, which causes increase in the manufacturing cost.

It should be noted that in the case of remounting the retardation plate to the appropriate position, it is required to reuse the retardation plate by cleansing away the applied ultra violet-curing adhesive, or to use another retardation plate coated with the ultra violet-curing adhesive. In addition, the same treatment is required to the light beam exit side surface of the transparent member because the ultra violet-curing adhesive is also attached to that surface. At any rate, this treatment also causes increase in the manufacturing cost.

SUMMARY

The invention has an advantage of solving at least a part of the problems described above, and can be realized as following aspects or application examples.

APPLICATION EXAMPLE 1

A polarization conversion unit according to the present application example includes a polarization splitting element array including a plurality of polarization splitting films disposed obliquely to an incident light beam and for splitting the incident light beam into two types of linearly-polarized light beams, a plurality of reflecting films disposed in parallel alternately between the polarization splitting films and for reflecting either one of the linearly-polarized light beams obtained by the polarization splitting films, and a translucent member provided with the polarization splitting films and the reflecting films, a plurality of retardation plates each formed of a quartz crystal member and for converting a polarization axis of either one of the linearly-polarized light beams obtained by the polarization splitting films into a polarization axis of the other of the linearly-polarized light beams, and a spacer member having a predetermined thickness and for bonding end sections of the retardation plates to a light beam exit side of the translucent member.

According to such a polarization conversion unit, since the end sections of the retardation plates are bonded to the light beam exit side of the translucent member forming the polarization splitting element array via the spacer member with a predetermined thickness, a gap formed between the light beam exit side surface of the translucent member and the light beam entrance side surfaces of the retardation plates with the predetermined thickness of the spacer member is assured. Therefore, there can be realized the polarization conversion unit capable of preventing the optical defect, which becomes easy to occur when the retardation plates formed of the quartz crystal members are bonded, such that the interference pattern is projected on the projected image (the damage to the optical characteristics), and keeping the optical characteristics (e.g., the characteristic of converting the polarization axis of either one of the linearly-polarized light beams obtained by the polarization splitting films into the polarization axis of the other of the linearly-polarized light beams) the retardation plates originally have. Further, since the retardation plates are formed of the quartz crystal members, the heat radiation property of the polarization conversion unit can be improved, and the deterioration of the quality of the polarization conversion unit caused by the heat can be suppressed.

APPLICATION EXAMPLE 2

In the polarization conversion unit, it is preferable that the spacer member is capable of reattachment of the attached object.

According to such a polarization conversion unit, since the spacer member is capable of reattachment of the attached object, in the case in which the positions at which the retardation plates are mounted are inappropriate in the manufacturing process of bonding the retardation plates to the light beam exit side of the translucent member, the retardation plates at the inappropriate positions can be detached from the spacer member and reattached at the appropriate positions, and consequently, increase in the manufacturing cost related to the reattachment can be suppressed.

APPLICATION EXAMPLE 3

A polarization conversion device according to the present application example includes the polarization conversion unit described above, and a fixing frame for fixing the polarization conversion unit, wherein the fixing frame includes a first fixing frame disposed on a light beam entrance side of the polarization splitting element array, and a second fixing frame disposed on a light beam exit side of the retardation plates, the first fixing frame has a fixing section for fixing the polarization element array, and the second fixing frame fixes the retardation plates to the polarization splitting element array via an elastic member.

According to such a polarization conversion device, the fixing frame is provided with the first fixing frame and the second fixing frame. Further, the first fixing frame has a fixing section for fixing the polarization element array. Further, the second fixing frame fixes the retardation plates to the polarization splitting element array via the elastic member with elasticity disposed on the light beam exit side of the retardation plates. According to this configuration, the retardation plates bonded via the spacer member of the polarization conversion unit are fixed by the second fixing frame via the elastic member. Therefore, there can be realized the polarization conversion device in which the gap between the light beam exit side surfaces of the translucent members and the light beam entrance side surfaces of the retardation plates is fixed while being kept as an appropriate amount, and further the retardation plates are fixed at the appropriate plan positions.

APPLICATION EXAMPLE 4

In the polarization conversion device described above, it is preferable that the first fixing frame includes a plurality of opening sections disposed at positions corresponding to the polarization splitting films and for allowing a light beamemitted from a light source to pass through, and a plurality of light blocking sections disposed at positions corresponding to the reflecting films and for blocking a part of the light beam emitted from the light source.

According to such a polarization conversion device, since the first fixing frame is provided with opening sections at positions corresponding to the polarization splitting films, it is possible to allow the light beam generating the effective polarized light beam to enter the polarization splitting films through the opening sections. Further, since the light blocking sections are disposed at positions corresponding to the reflecting films, the light beam generating the ineffective polarized light beam can be blocked by the light blocking sections, thus the polarization conversion device capable of performing the effective polarization conversion can be realized.

APPLICATION EXAMPLE 5

In the polarization conversion device described above, it is preferable that a size G of a gap between the polarization splitting element array and the retardation plates is in a range of $0.01 \leqq G \leqq 0.3$ mm.

According to such a polarization conversion device, the gap (the gap between the light exit side surface of the translucent member forming the polarization splitting element array and the light entrance side surface of the retardation plates) between the polarization splitting element array and the retardation plates is appropriately assured so that the gap is equal to or greater than the wavelength of the light beam and the light beam enters within the effective area of the retardation plates. Therefore, there can be realized the polarization conversion device capable of preventing the damage to the optical characteristics such that it becomes easy for the defect (such as the interference pattern) in the projection image to occur, and for keeping the optical characteristics the polarization conversion unit originally has.

APPLICATION EXAMPLE 6

A projector according to the present application example includes a light source, any one of the polarization conversion devices described above, a light modulation device for modulating a light beam emitted from the polarization conversion device based on image information, and a projection optical device for projecting the light beam modulated by the light modulation device.

According to such a projector, there can be realized the projector capable of preventing the optical defect to the projection image from occurring by either one of the polarization conversion devices described above appropriately assuring the gap (the gap between the polarization splitting element array and the retardation plates) between the light beam exit side surface of the translucent member and the light beam entrance side surface of the retardation plates and the plan positions of the retardation plates, and of improving the heat radiation property of the polarization conversion device by the retardation plates using the quartz crystal members.

BRIEF DESCRIPTION OF THE DRAWINGS

The invention will now be described with reference to the accompanying drawings, wherein like numbers reference like elements.

FIGS. 6A and 6B are perspective views showing a polarization conversion unit, wherein FIG. 6A is a schematic perspective view of the polarization conversion unit, and FIG. 6B is an exploded view for explaining assembling of the polarization conversion unit.

FIGS. 9A and 9B are cross-sectional views of substantial parts of the polarization conversion device, wherein FIG. 9A is a cross-sectional view along the A-A line in FIG. 5, and FIG. 9B is a cross-sectional view along the B-B line in FIG. 5.

DESCRIPTION OF EXEMPLARY EMBODIMENTS

Embodiments of the invention will herein after be explained with reference to the accompanying drawings.

Embodiment

Figure 1:
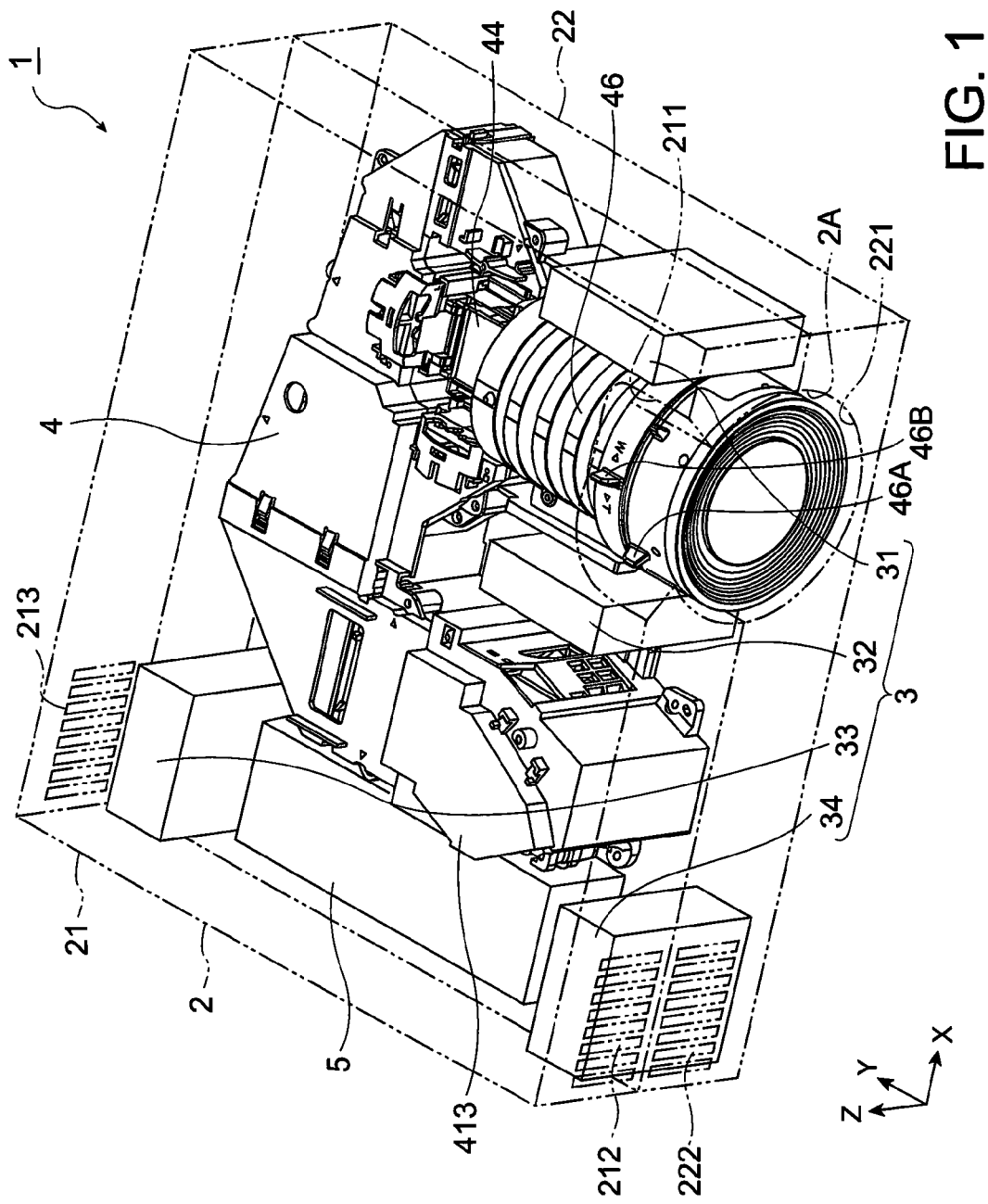
FIG. 1 is a perspective view for explaining a schematic configuration of a projector according to an embodiment of the invention.

FIG. 1 is a perspective view for explaining a schematic configuration of a projector according to an embodiment of the invention. Hereinafter, the configuration of the projector 1 will be explained with reference to FIG. 1.

The projector 1 is configured including an exterior case 2 having a roughly cuboid shape as a whole, and a cooling unit 3 for reducing the heat accumulated in the projector 1. Further, the projector 1 is configured including an optical unit 4 for optically processing the light beam emitted from a light source to form an optical image based on image information, and a power supply unit 5 for supplying the constituents of the projector 1 with power externally supplied via a power supply cable (not shown).

The exterior case 2 is composed of an upper case 21 for forming the upper face, the front face, the side faces, and rear face of the projector 1 and a lower case 22 for forming the bottom face, the front face, the side faces, and rear face of the projector 1, both of the upper case 21 and the lower case 22 being made of a metal material. These cases 21, 22 are fixed to each other with screws. It should be noted that the exterior case 2 is not limited to what is made of metal, but what is made of a synthetic resin material can also be adopted as the exterior case 2.

The front face of the upper case 21 is provided with a notch section 211 forming a circular opening section 2A in the condition in which the upper case 21 is combined with the lower case 22, and a part of a projection lens 46, described later, of the optical unit 4 disposed inside the exterior case 2 is exposed through the opening section 2A. Further, it is arranged that the focusing operation of the projection lens 46 can manually be performed via a lever 46A as a part of the exposed section. Similarly, it is arranged that the zooming operation of the projection lens 46 can manually be performed via a lever 46B as a part of the exposed section. Further, at a position on the front face of the upper case 21 and on the opposite side of the opening section 2A, there is formed an air outlet 212 for discharging the air heated inside the projector 1 to the outside by the cooling unit 3.

On the rear face of the upper case 21, there is formed an air inlet 213 for sucking the cooling air in from the outside by the cooling unit 3 at a position opposed to the rear face of the power supply unit 5. Further, although omitted from the drawings, the rear face of the upper case 21 is provided with various kinds of equipment connection terminals such as a connection section to be connected to a computer, a video input terminal, and an audio equipment connection terminal. Further, on the inside surface of the rear face of the upper case 21, there is disposed an interface board (not shown) mounting a signal processing circuit for performing processing of a signal such as a picture signal.

The bottom face of the lower case 22 is provided with an air inlet (not shown) disposed under the optical device 44, described later, of the optical unit 4 and for sucking the cooling air in from the outside by the cooling unit 3. On the rear face of the lower case 22, there is formed an air inlet (not shown) for sucking the cooling air in from the outside by the cooling unit 3 in series with the air inlet port 213 formed on the rear face of the upper case 21. The front face of the lower case 22 is provided with a notch section 221 so as to form the circular opening section 2A together with the notch section 211 in the condition in which the lower case 22 is combined with the upper case 21. Further, on the front face of the lower case 22, there is formed an air outlet 222 at a position on the opposite side of the opening section 2A in series with the air outlet 212 formed on the front face of the upper case 21 and for discharging the air heated inside the projector 1 to the outside by the cooling unit 3.

The cooling unit 3 delivers the cooling air into a cooling channel (not shown) formed inside the projector 1 to reduce the heat generated in the projector 1. The cooling unit 3 is located on the sides of the projection lens 46, described later, of the optical unit 4, and configured including a pair of sirocco fans 31, 32 for sucking the cooling air in from an air inlet, not shown, provided to the bottom face of the lower case 22. Further, the cooling unit 3 is configured including an axial intake fan 33 located adjacently to the rear face of the exterior case 2 and for sucking the cooling air in from the air inlet 213 provided to the rear face, and an axial exhaust fan 34 located adjacently to the front face of the exterior case 2 and for drawing the air in the projector 1 to discharge the heated air from the air outlets 212, 222 provided to the front face.

The power supply unit 5 is disposed in the projector 1 so as to extend from the rear face of the exterior case 2 to the front face thereof. Although omitted from the drawings, the power supply unit 5 is provided with a power supply for supplying the constituents of the projector 1 with the power supplied from the outside via the power cable, and a lamp drive circuit for supplying the power supplied from the power supply to a light source device 413, described later, of the optical unit 4. Although omitted from the drawings, the power supply and the lamp drive circuit are covered on the periphery thereof by a shield member made of metal such as an aluminum material having openings on both ends. Further, it is configured so that the cooling air sucked in from the axial intake fan 33 of the cooling unit 3 is guided by the shield member, and at the same time, the electromagnetic noise generated in the power supply or the drive circuit is prevented from leaking to the outside.

Figure 2:
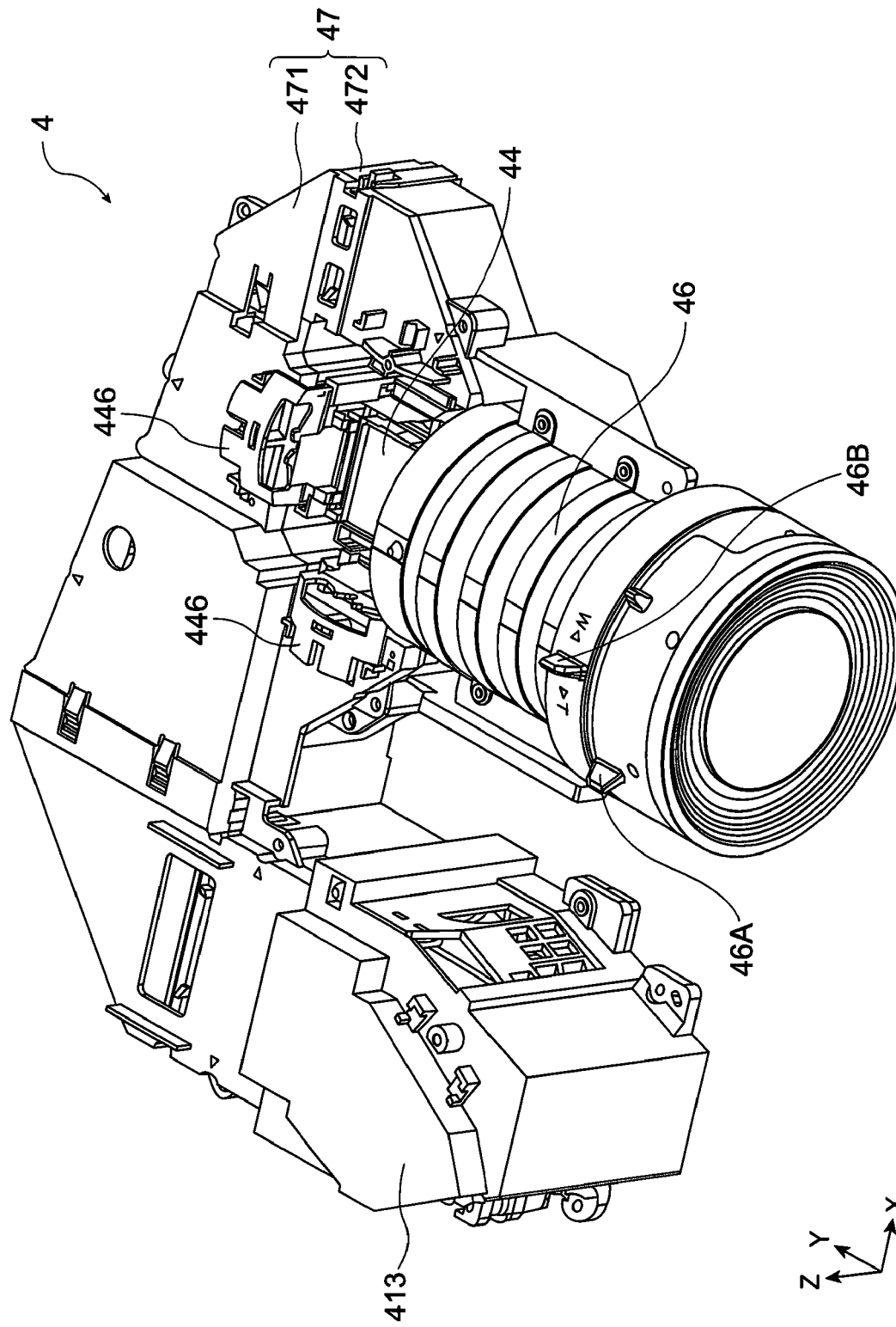
FIG. 2 is a perspective view of an optical unit viewed from the above thereof.

FIG. 2 is a perspective view of the optical unit viewed from the above thereof.

The optical unit 4 is a unit for optically processing the light beam emitted from the light source device 413 to form an optical image based on image information, and then projecting the optical image. As shown in FIG. 1 or FIG. 2, the optical unit 4 has a roughly U-shape in the plan view extending from the front face side to the rear face side, further extending along the rear face, and further extending from the rear face side to the front face side in the exterior case 2. Although omitted from the drawings, the optical unit 4 is electrically connected to the power supply unit 5. Further, above the optical unit 4, there is disposed a control circuit (not shown) for loading the image information to perform control, arithmetic processing, and so on, and controlling each of the liquid crystal panels 441R, 441G, and 441B forming a light modulation device described later.

Figure 3:
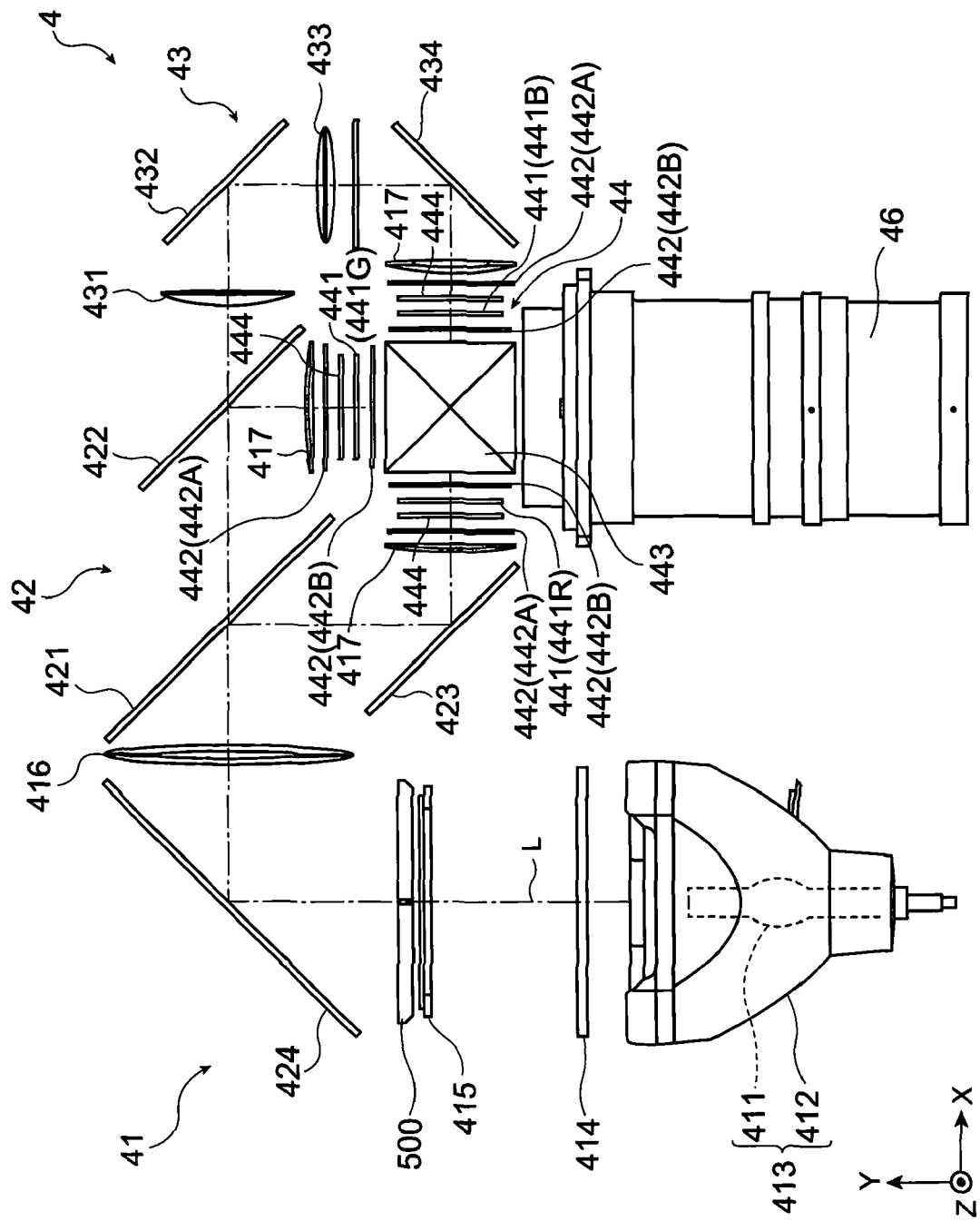
FIG. 3 is a diagram schematically showing an optical system of the optical unit.

FIG. 3 is a diagram schematically showing the optical system of the optical unit. The configuration and the operation of the optical unit 4 will be explained with reference to FIG. 3.

The optical unit 4 is provided with an integrator illuminating optical system 41 as an illuminating optical device, a color separator optical system 42, a relay optical system 43, an optical device 44, the projection lens 46 as a projection optical device, and a light guide 47 (see FIG. 2) as an optical component chassis formed of a synthetic resin material and for housing these optical components 41 through 44, and 46.

The integrator illuminating optical system 41 is an optical system for substantially evenly illuminating the image forming area of the three liquid crystal panels 441 (the liquid crystal panels 441 for respective colored light beams of red light beam, green light beam, and blue light beam are represented as liquid crystal panels 441R, 441G, and 441B, respectively) forming the optical device 44. The integrator illuminating optical system 41 is provided with the light source device 413, a first lens array 414, a second lens array 415, a polarization conversion unit 500, a reflecting mirror 424, and an overlapping lens 416.

The light source device 413 has a light source lamp 411 as a radial light source for emitting a radial light ray (light beam), and a reflector 412 for reflecting the radial light emitted from the light source lamp 411. Further, the radial light beam emitted from the light source lamp 411 is reflected by the reflector 412 to be a substantially parallel light beam, and then emitted to the outside. Although a high-pressure mercury lamp is adopted as the light source lamp 411, a metal halide lamp or a halogen lamp can also be adopted. Further, although a parabolic mirror is adopted as the reflector 412, the reflector is not so limited, but the configuration of including a reflector of an ellipsoidal mirror and a concave collimation lens disposed on the exit surface side of the reflector can also be adopted.

The first lens array 414 has a configuration in which small lenses each having a substantially rectangular outline viewed in the optical axis direction are arranged in a matrix. The small lenses divide the beam emitted from the light source lamp 411 into a plurality of partial light beams.

The second lens array 415 has substantially the same configuration as the first lens array 414, namely the configuration having small lenses arranged in a matrix. The second lens array 415, in conjunction with the overlapping lens 416, has a function of focusing the image of the small lenses of the first lens array 414 on the liquid crystal panels 441. The first lens array 414 and the second lens array 415 form a beam splitting optical element.

A polarization conversion unit 500 is disposed posterior to the second lens array 415. Such a polarization conversion unit 500 is for converting the light from the second lens array 415 into a substantially single polarized light beam, and thus enhancing the light efficiency in the optical device 44. The polarization conversion unit 500 will be described later in detail.

The partial light beams each converted into the substantially single polarized light beam by the polarization conversion unit 500 are finally overlapped substantially on the liquid crystal panels 441R, 441G, and 441B of the optical device 44 by the overlapping lens 416. In the projector 1 (the optical device 44) of the present embodiment using a type of the liquid crystal panels 441 of converting polarized light beams, since only the single polarized light beam is available, almost a half of the light beams from the light source lamp 411, which emits other types of random polarized light beams, are not available. Therefore, by using the polarization conversion unit 500, almost all of the light beams emitted from the light source lamp 411 are converted into a single type of polarized light beams, thereby enhancing light efficiency in the optical device 44.

The color separator optical system 42 is provided with two dichroic mirrors 421, 422 and a reflecting mirror 423, and has a function of separating the plurality of partial light beams emitted from the integrator illuminating optical system 41 into three colored light beams of the red light beam, the green light beam, and the blue light beam by the dichroic mirrors 421, 422.

The relay optical system 43 is provided with an entrance lens 431, a relay lens 433, and reflecting mirrors 432, 434, and has a function of guiding the colored light beam (the blue light beam in the present embodiment) obtained by the separation operation of the color separator optical system 42 to the liquid crystal panel 441B.

In this case, the dichroic mirror 421 of the color separator optical system 42 transmits the blue light component and the green light component of the light beam emitted from the integrator illuminating optical system 41, and reflects the red light component thereof. The red light beam reflected by the dichroic mirror 421 is further reflected by the reflecting mirror 423 and reaches the liquid crystal panel 441R for the red light beam through a field lens 417. The field lens 417 converts each of the partial light beams emitted from the second lens array 415 into a light beam parallel to the center axis (principal ray). The same applies to other field lenses 417 disposed on the light entrance side of the respective liquid crystal panels 441G, 441B.

Out of the green light beam and the blue light beam transmitted through the dichroic mirror 421, the green light beam is reflected by the dichroic mirror 422, and reaches the liquid crystal panel 441G for the green light beam through the field lens 417. Meanwhile the blue light beam is transmitted through the dichroic mirror 422, passes through the relay optical system 43, and then reaches the liquid crystal panel 441B for the blue light beam through the field lens 417. It should be noted that the relay optical system 43 is used for the blue light beam for preventing degradation of light efficiency caused by the diffusion of the blue light beam, which has the optical path longer than the optical paths of other colored light beams. In other words, it is provided for transmitting the partial light beams entering the entrance lens 431 directly to the field lens 417.

The optical device 44 is provided with the three liquid crystal panels 441 (441R, 441G, and 441B) to be the light modulation device, polarization plates 442, field angle correction plates 444, and across dichroic prism 443. It should be noted that the liquid crystal panels 441R, 441G, and 441B use the polysilicon TFTs as switching elements.

The colored light beams obtained by the separation operation of the color separator optical system 42 are respectively modulated by the three liquid crystal panels 441R, 441G, and 441B and the polarization plates 442 provided to the light beam entrance side and the light beam exit side of these liquid crystal panels based on the image information, thereby forming the optical image.

The polarization plates 442 include entrance side polarization plates 442A and exit side polarization plates 442B respectively disposed anterior to the liquid crystal panels 441 (441R, 441G, and 441B) and posterior thereof. The entrance polarization plate 442A is for transmitting only a polarized light beam with a predetermined polarizing direction out of each of the colored light beams separated off by the color separator optical system 42 and absorbing other light beams, and is composed of a substrate made of sapphire glass or the like with a polarization film attached thereto. Further, it is also possible to attach the polarization film to the field lens 417 instead of using the substrate.

The exit side polarization plate 442B is also configured similarly to the entrance side polarization plate 442A, and is for transmitting only the polarized light beam with the predetermined polarizing direction out of the light beams emitted from the liquid crystal panels 441 (441R, 441G, and 441B) and absorbing other light beams. Further, it is also possible to attach the polarization film to the cross dichroic prism 443 instead of using the substrate. The entrance side polarization plate 442A and the exit side polarization plate 442B are arranged to have polarization axes, respectively, whose directions are perpendicular to each other.

The field angle correction plates 444 are each provided with an optical conversion film formed on the substrate and having a function of correcting the field angle of the optical image formed by the respective liquid crystal panels 441 (441R, 441G, and 441B). By disposing such field angle correction plates 444 as described above, light leakage on the black screen can be reduced, thus the contrast of the projected image can dramatically be improved. Further, each of the field angle correction plates 444 is held by a correction plate holder rim 446 (see FIG. 2), and is configured so that the position thereof can be adjusted with respect to the illumination optical axis L defined in the optical unit 4.

The cross dichroic prism 443 is for combining images each modulated for corresponding colored light beam emitted from respective one of the three liquid crystal panels 441R, 441G, and 441B to form a color image. It should be noted that the cross dichroic prism 443 is composed of a dielectric multilayer film for reflecting red light and a dielectric multilayer film for reflecting blue light formed along the boundary faces of four rectangular prisms to form a substantially X shape, and the three colored light beams are combined by these dielectric multilayer films.

The projection lens 46 is configured as a combination lens in which a plurality of lenses is combined with each other, and projects the color image combined by the cross dichroic prism 443 on the screen. The projection lens 46 is provided with levers 46A, 46B (see FIGS. 1 and 2) for changing the relative position of the plurality lenses, and is configured so that the focus adjustment and the zoom adjustment of the projected color image can be performed.

The optical systems 41 through 44 described above are housed inside the light guide 47 (see FIG. 2). The light guide 47 is composed of a lower light guide 472 (see FIG. 2) provided with groove sections in which the optical components 414 through 417, 421 through 424, 431 through 434, and 500 (a polarization conversion device 50 described later in detail) are fit respectively by sliding them from the above, and an upper light guide 471 (see FIG. 2) having a lid-like shape for blocking up the opening side on the upper part of the lower light guide 472. Further, the light source device 413 is housed in one end of the light guide 47 having a roughly U-shape in a plan view, and the projection lens 46 is fixed on the other end thereof. Still further, the optical device 44 is fixed anterior to the projection lens 46.

Figure 4:
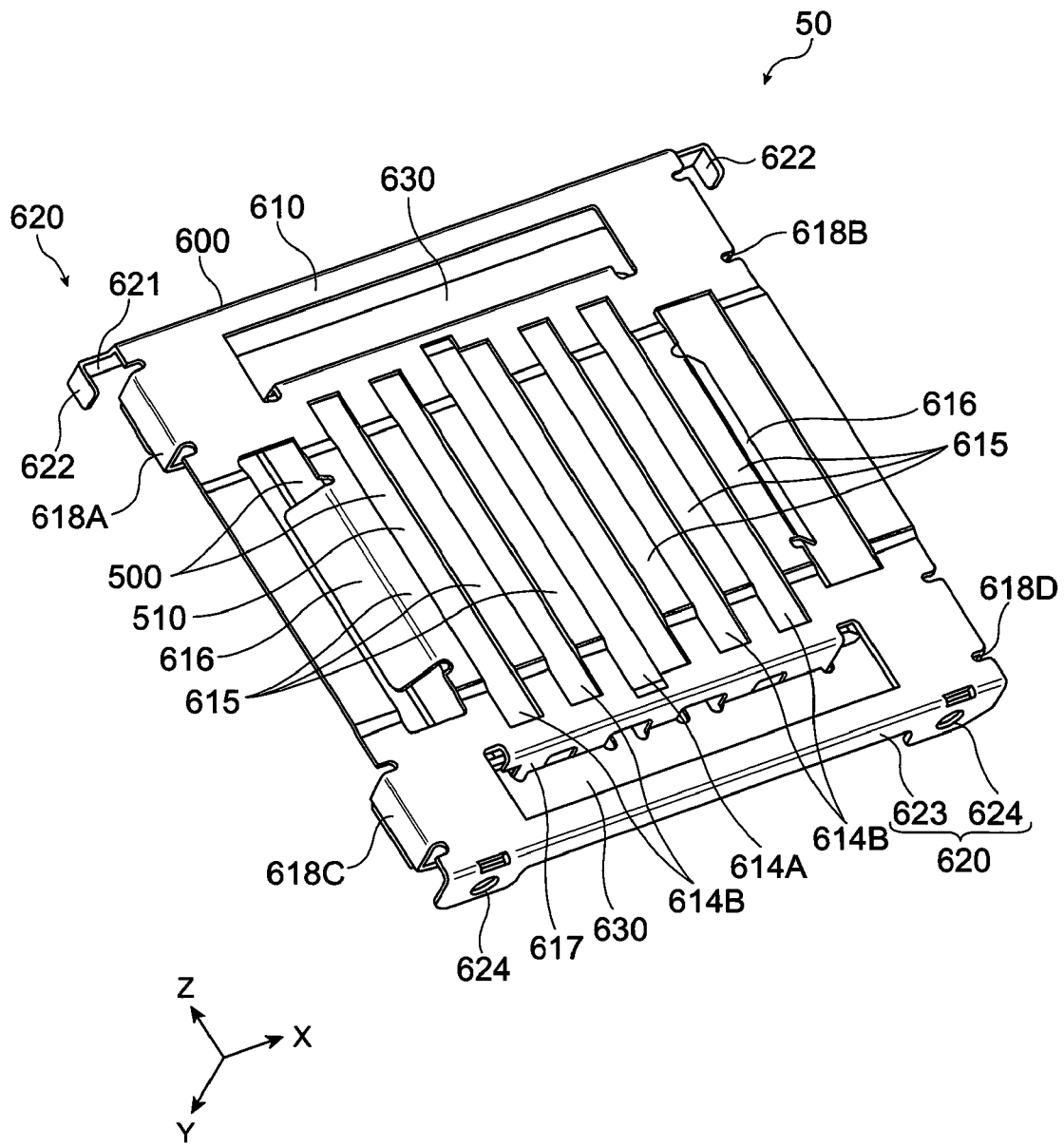
FIG. 4 is a perspective view of a polarization conversion device viewed from the light beam entrance side.
Figure 5:
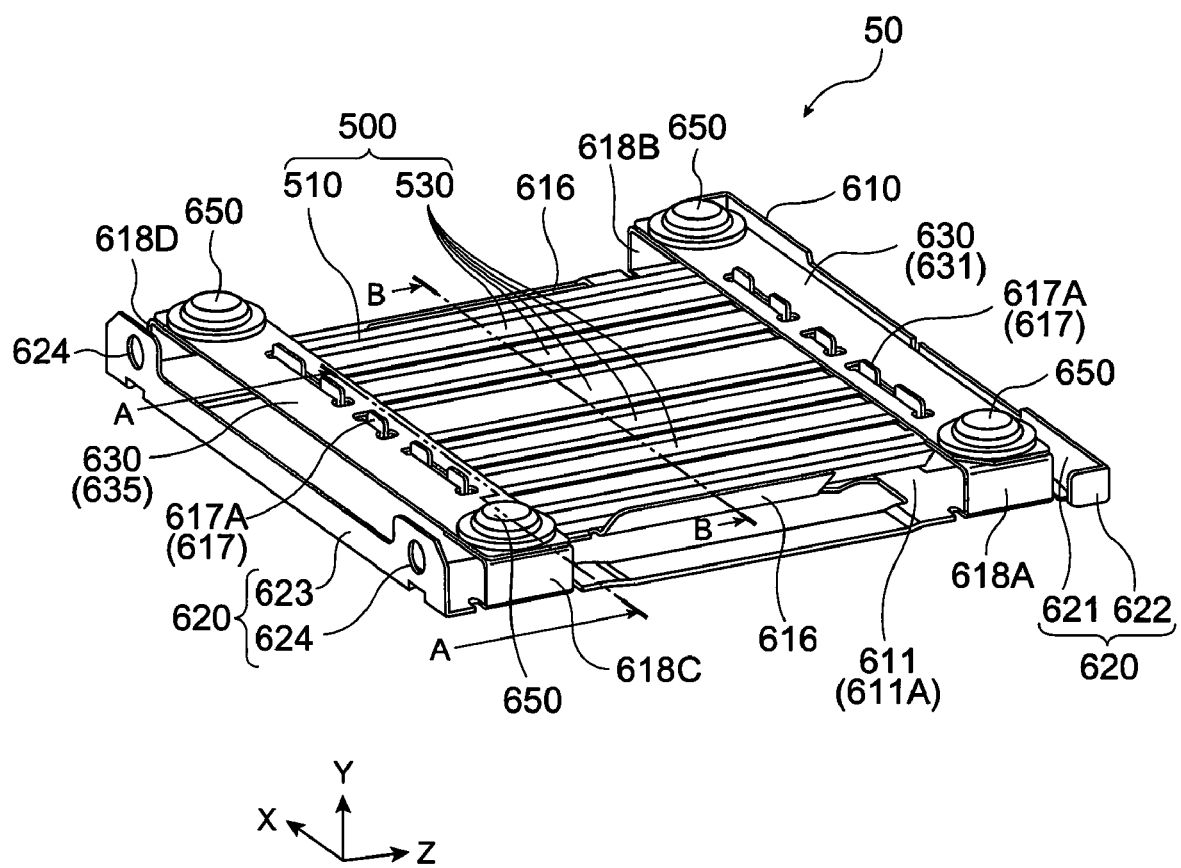
FIG. 5 is a perspective view of the polarization conversion device viewed from the light beam exit side.

FIG. 4 is a perspective view of the polarization conversion device viewed from the light beam entrance side. FIG. 5 is a perspective view of the polarization conversion device viewed from the light beam exit side. The schematic configuration of the polarization conversion device 50 will be explained with reference to FIGS. 4 and 5.

The polarization conversion device 50 is composed of the polarization conversion unit 500 described above and a fixing frame 600 for housing (fixing) the polarization conversion unit 500. Further, the fixing frame 600 fixes the polarization conversion unit 500 so that the polarization conversion unit 500 positioned at a predetermined region of the lower light guide 472. The polarization conversion device 50 optically converting the light beams collected by the small lenses of the second lens array 415 into substantially single type of polarized light beams by an operation of the polarization conversion unit 500 described above when transmitting the light beams collected by the small lenses of the second lens array 415.

The fixing frame 600 is composed of a first fixing frame 610 and second fixing frames 630. The first fixing frame 610 is disposed on the light beam entrance side of the polarization conversion unit 500 while the second fixing frames 630 are disposed on the light beam exit side of the polarization conversion unit 500. The first fixing frame 610 forms a substantially rectangular rim shape in a plan view, and a polarization splitting element array 510 of the polarization conversion unit 500 is bonded fixedly to the inside thereof. Further, the second fixing frames 630 are respectively disposed on both ends of the retardation plates 530 on the light beam exit side of the retardation plates 530. Further, the second fixing frames 630 are configured as holding plates 631, 635 each formed to have a rectangular plate-like shape. It should be noted that in the following explanations the second fixing frames 630 are arbitrarily referred to as the holding plates 631, 635.

It should also be noted that the polarization conversion device 50 is configured including a silicone adhesive 640 (see FIG. 8) as an elastic member having elasticity. Further, the polarization conversion device 50 has a configuration in which the silicone adhesive 640 is applied to the ends of the retardation plates 530, then the holding plates 631, 635 are mounted on arm sections 618 provided to the first fixing frame 610 from above the portions coated with the silicone adhesive 640 to be fixed to the arm sections 618 with flanged screws 650. The details thereof will be described later.

Figure 6A:
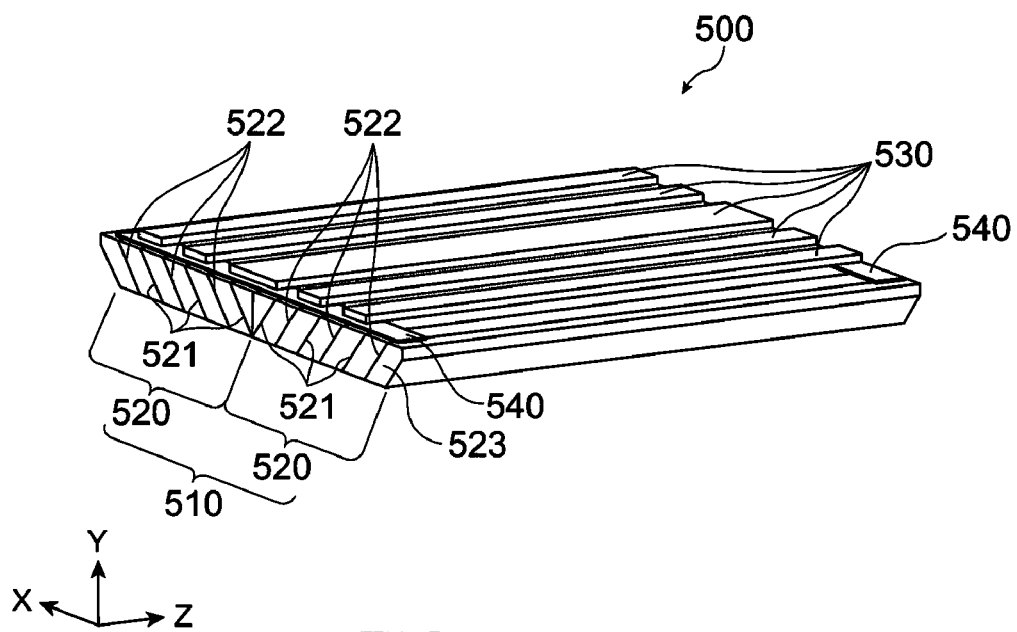
Figure 6B:
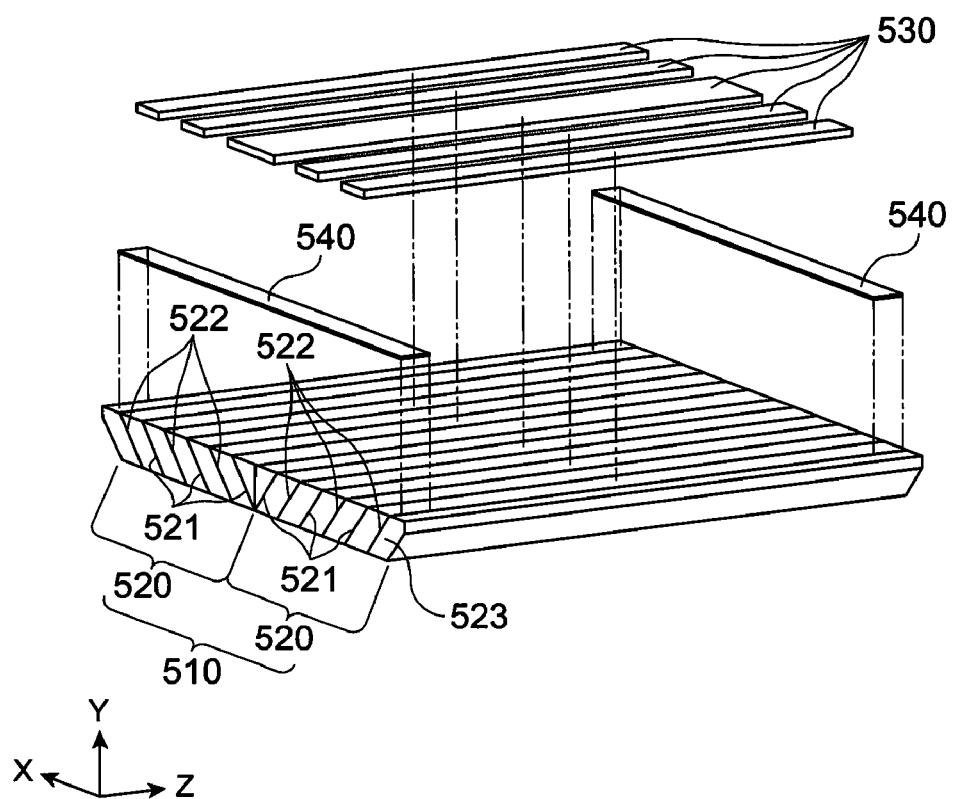

FIGS. 6A and 6B are perspective views showing the polarization conversion unit, wherein FIG. 6A is a schematic perspective view of the polarization conversion unit, and FIG. 6B is an exploded view for explaining assembling of the polarization conversion unit. The configuration and the assembling method of the polarization conversion unit 500 will be explained with reference to FIGS. 6A and 6B.

The polarization conversion unit 500 is configured including the polarization splitting element array 510 having a planar shape, a plurality of (five in the present embodiment) retardation plates 530 each shaped like a rectangular strip and made of a quartz crystal member, and two double-sided adhesive tapes 540 as spacer members. It should be noted that in the polarization conversion unit 500 the polarization splitting element array 510 performs a splitting operation into two types of linearly polarized light beams, the retardation plates 530 rotates the polarization axis of one of the two types of linearly polarized light beams obtained by the splitting operation as much as 90° to make the polarization axis of the one of the two types of linearly polarized light beams identical to the polarization axis of the other of the two types of linearly polarized light beams.

The polarization splitting element array 510 splits the incident light beam into the two types of linearly polarized light beams and emits them. As shown in FIGS. 6A and 6B, the polarization splitting element array 510 is composed of two polarization splitting elements 520 bonded with each other. The polarization splitting element 520 is provided with a plurality of polarization splitting films 521 disposed obliquely to the incident light beam (disposed at an angle of roughly 45° with the lighting beam axis L), reflecting films 522 disposed in parallel alternately between the polarization splitting films 521, and glass plates as translucent members 523 disposed so as to interpose between the polarization splitting films 521 and the reflecting films 522.

The polarization splitting films 521 are each composed of a dielectric multilayer film with the Brewster angle set to roughly 45° and so on. The polarization splitting films 521 are for reflecting the light beam (S-polarized light beam) as the one of the linearly polarized light beams having the polarization axis parallel to the entrance surface of the polarization splitting films 521 in the incident light beam while transmitting the light beam (P-polarized light beam) having the polarization axis perpendicular to the S-polarized light beam, thereby splitting the incident light beam into two types of linearly polarized light beams.

The reflecting films 522 are each made of a single metal material having high reflectivity such as Al, Au, Ag, Cu, or Cr, or an alloy including two or more kinds of these metals, for example, and reflect the S-polarized light beam reflected by the respective polarization splitting films 521. It should be noted that it is possible to use an equivalent of the polarization splitting film 521 as the reflecting film 522 for reflecting the S-polarized light beam. The glass plates as the translucent members 523 are members through which the light beam is transmitted, and typically made of while crown glass or the like.

The retardation plates 530 rotate the polarization axis of the P-polarized light beam transmitted through the respective polarization splitting films 521 as much as 90°. As shown in FIGS. 6A and 6B, the retardation plates 530 are bonded on the light beam exit end surface of each the polarization splitting elements 520 at positions corresponding to the polarization splitting films 521 when viewed in the direction along the lighting beam axis L.

The polarization conversion unit 500 is configured to have two polarization splitting elements 520 arranged to be bilaterally symmetric. In other words, the two polarization splitting elements 520 are configured so that the distance between the polarization splitting film 521 belonging to one of the two polarization splitting element 520 and the polarization splitting film 521 belonging to the other of the two polarization splitting element 520 monotonically increases from one surface of the polarization splitting element array 510 toward the other surface thereof, and are bonded with each other.

As shown in FIG. 6B, in assembling the polarization conversion unit 500, the double-sided adhesive tapes 540 are firstly attached to the light beam exit side surface of the planar polarization splitting element array 510 at an upper end section and a lower end section (in the Z direction) of the polarization splitting array 510, respectively. Subsequently, the retardation plates 530 are mounted on the upper surfaces of the double-sided adhesive tapes 540 from above (in the Y direction) the double-sided adhesive tapes 540 thus attached while being aligned at the positions corresponding to the respective polarization splitting films 521, and then each of the retardation plates 530 is pressed. The polarization conversion unit 500 is completed through the series of assembling steps. It should be noted that the assembling is performed using a jig for assembling.

It should also be noted that the double-sided adhesive tapes 540 can be detached and then attached again. Further, the double-sided adhesive tapes 540 with thickness of 0.15 mm are used. By using such double-sided adhesive tapes 540, if the positions on the upper surfaces of the double-sided adhesive tapes 540 at which the retardation plates 530 are mounted are not appropriate for some reasons, the retardation plates 530 at inappropriate positions are detached from the double-sided adhesive tapes 540 and then attached again at the appropriate positions.

The polarization conversion unit 500 assembled in a manner as described above has a configuration in which the double-sided adhesive tapes 540 are held between the light beam exit side of the polarization splitting element array 510 and the light beam entrance side of the retardation plates 530 at the both end sections of the polarization splitting element array 510 and both end sections of the retardation plates 530. It should be noted that the double-sided adhesive tapes 540 are positioned at the region of the polarization conversion unit 500 outside the effective area of the light beam emitted from the light source lamp 411.

Figure 7:
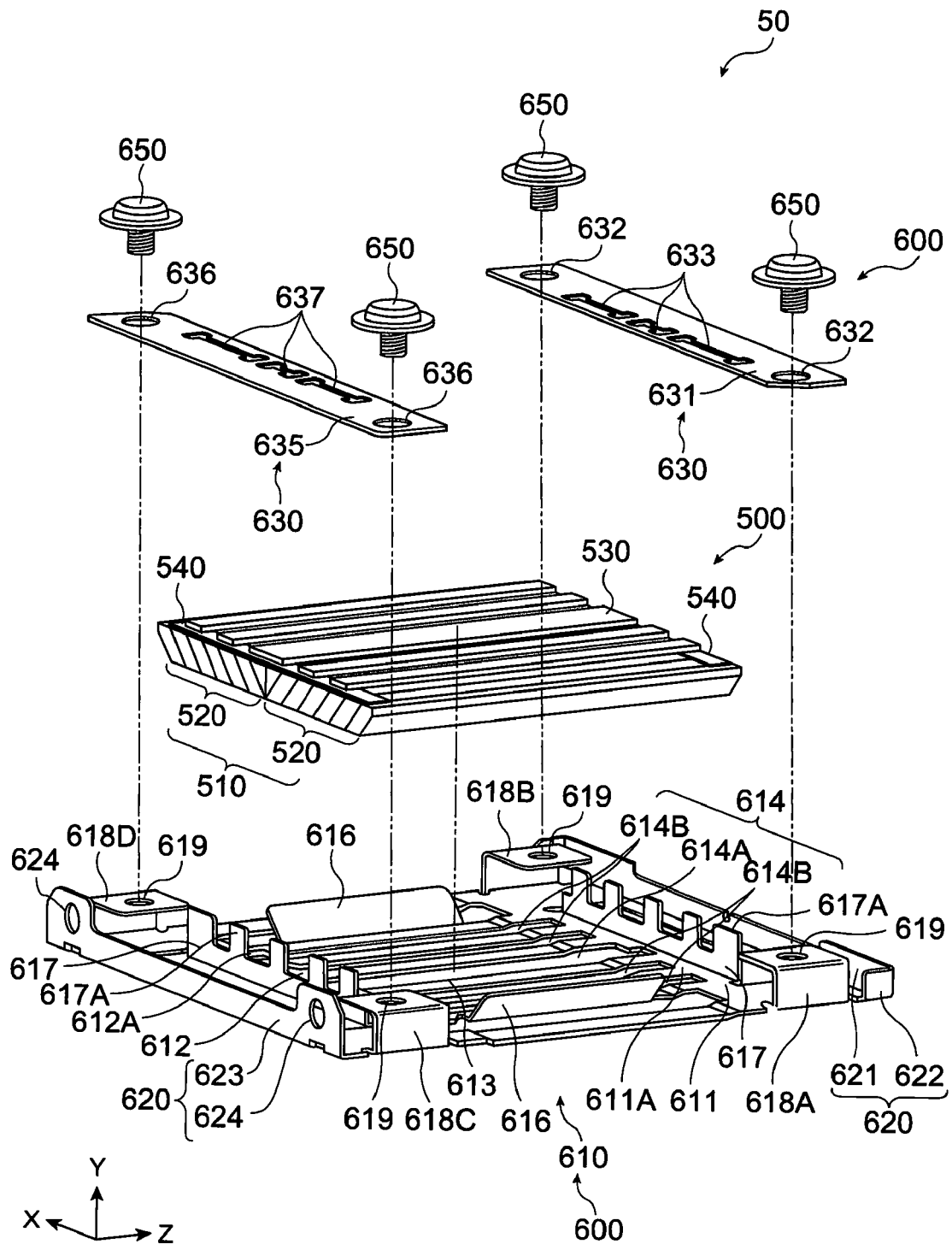
FIG. 7 is an exploded view for explaining assembling of the polarization conversion device.
Figure 8:
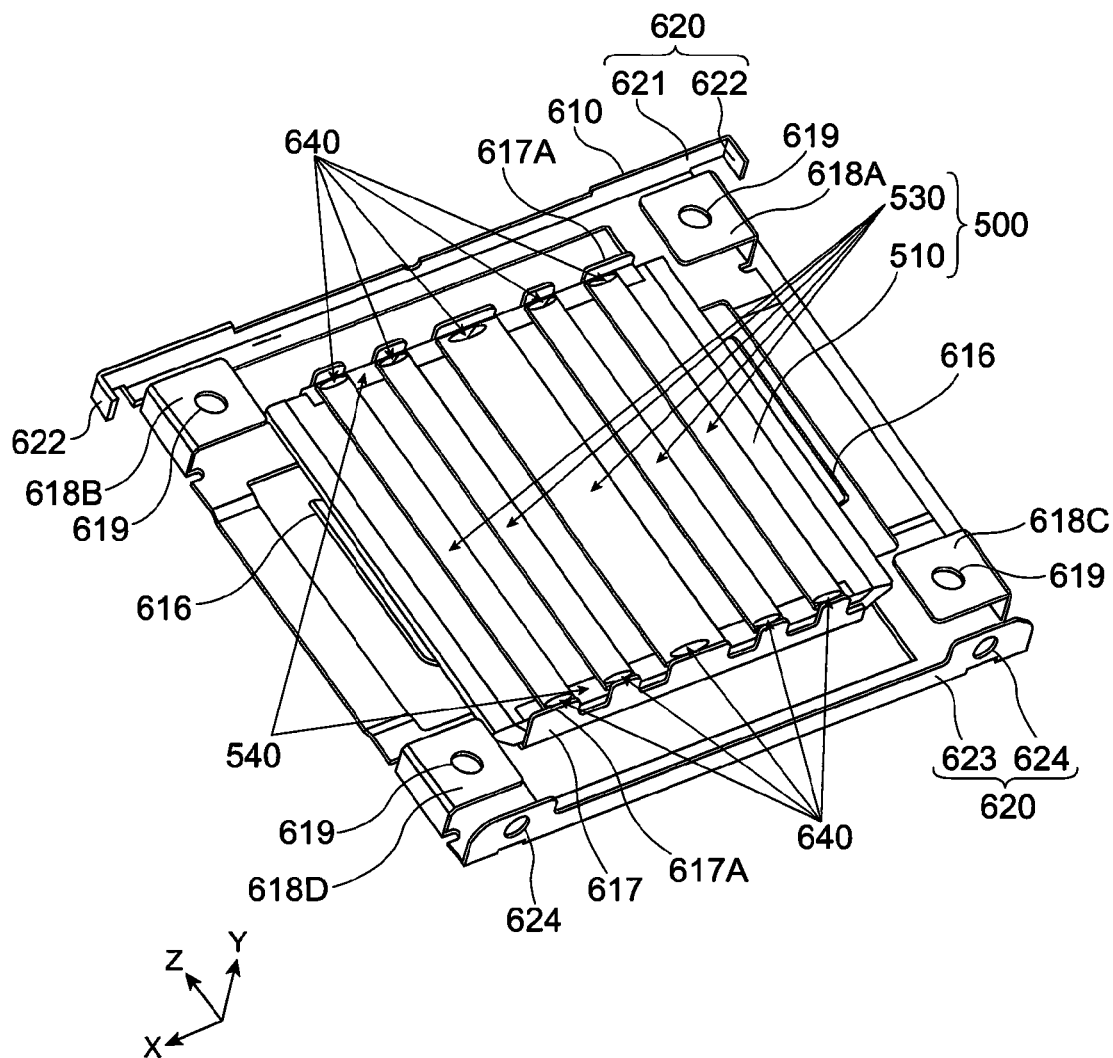
FIG. 8 is a diagram showing a silicone adhesive as an elastic member in the assembling of the polarization conversion device.

FIG. 7 is an exploded view for explaining assembling of the polarization conversion device. FIG. 8 is a diagram showing a silicone adhesive as an elastic member in the assembling of the polarization conversion device. The configuration of the fixing frame 600 and the assembling method of the polarization conversion device 50 will be explained with reference to FIGS. 7 and 8 (also FIGS. 4 and 5 if necessary).

Firstly, the configuration of the first fixing frame 610, which is provided to the fixing frame 600, disposed on the light entrance side of the polarization conversion unit 500, and further forms a base of the assembling of the polarization conversion device 50, will be explained.

The first fixing frame 610 is made of a metal material such as a stainless steel material, and has a roughly rectangular rim shape in a plan view. Further, the first fixing frame 610 is provided with bonding sections 611, 612 having bonding surfaces 611A, 612A to which the light beam entrance end surface of the polarization conversion unit 500 is bonded, and a lower step section 613 formed a step lower than the bonding sections 611, 612 in the −Y direction on the both ends thereof in the Z direction. It should be noted that in the present embodiment, the bonding sections 611, 612 form the fixing sections for fixing the polarization splitting element array 510.

Further, the first fixing frame 610 is provided with rectangular opening sections 614 extending in the vertical direction (the Z direction) straddling the bonding sections 611, 612 and the lower step section 613. The opening sections 614 includes an opening section 614A formed in substantially the center position, and the opening sections 614B formed on both sides of the opening section 614A two-by-two with substantially the same intervals. The opening section 614A is configured to have a width roughly double of the width of the opening sections 614B.

The opening section 614A is a space for exposing the polarization splitting film 521 located at roughly the center section of the polarization conversion unit 500 and roughly the center section of the two polarization splitting elements 520 to the light beam entrance side (the −Y direction). The opening sections 614B are spaces for exposing the polarization splitting films 521 at the other positions to the light beam entrance side (the −Y direction). In other words, as shown in FIG. 4, a light blocking sections 615 for blocking the entrance of the light beam from the light source lamp 411 by shielding the reflecting films 522 are to be provided to the first fixing frame 610 when viewed from the light beam entrance side in a direction along the lighting beam axis L.

Further, the first fixing frame 610 is provided with guide sections 616 located at both ends of the light blocking sections 615, inclined in the Y direction from the edge section thereof, and formed like wings. The edges in the lateral direction (the X direction) of the polarization splitting element array 510 of the polarization conversion unit 500 are guided by the guide sections 616. Further, the guide sections 616 play a role of the fixing sections for fixing the polarization splitting element array 510.

Further, the first fixing frame 610 is provided with guide sections 617 each having a comb-teeth shape, formed respectively in the bonding section 611 at the end in the Z direction and in the bonding section 612 at the end in the −Z direction, so as to be erected substantially vertically in the Y direction. The guide section 617 guides the edges in the vertical direction (the Z direction) of the polarization conversion unit 500. Further, the comb-tooth shaped protruding sections 617A of the guide sections 617 are also used for guiding the second fixing frames 630 described later.

Further, the first fixing frame 610 is also provided with arm sections 618 for fixing the second fixing frames 630. The arm sections 618 are located on the periphery of the first fixing frame 610 in the lateral direction (the X direction) of the two guide sections 617, and each formed to have a shape folded towards the Y direction and further towards the inside of the first fixing frame 610 thus configured to have a roughly bracket shape in a side view. Therefore, totally four arm sections are provided to the first fixing frame 610, namely two arm sections 618 (arm sections 618A, 618B) in the upper part thereof, and two arm sections 618 (arm sections 618C, 618D) in the lower part thereof. Further, the arm sections 618A, 618B, 618C, and 618D are provided with tapped screw holes 619 one-by-one.

Further, the first fixing frame 610 is provided with an engaging section 620, which is engaged with the lower light guide 472 to fix the polarization conversion device 50 (the first fixing frame 610) to the lower light guide 472 and the upper light guide 472. The engaging section 620 includes flared sections 621 formed on the upper end section, folded towards the +Y direction, and each having a roughly bracket shape in a plan view. The flared sections 621 prevent the position shift of the polarization conversion device 50 in the Y direction inside the light guide 47. Further, the engaging section 620 includes flared sections 622 formed by folding the lateral ends of the flared sections 621 towards the −Z direction. The flared sections 622 prevent the position shift of the polarization conversion device 50 in the X direction inside the light guide 47.

Further, the engaging section 620 has flared sections 623 formed also on the lower end section, folded towards the +Y direction, and having a roughly bracket shape in a plan view similarly to the flared sections 621. The flared sections 623 are provided with circular holes 624 one-by-one on the tip of the roughly bracket shape in a plan view. The circular holes 624 are portions to which two protrusions, not shown, provided to the lower light guide 472 are inserted when the polarization conversion device 50 is housed in the lower light guide 472. Thus, the movement of the lower end side of the polarization conversion device 50 is restricted in the light guide 47.

Now, the assembling method of the polarization conversion device 50 will be explained.

Firstly, the step of fixing the polarization conversion unit 500 to the first fixing frame 610 is executed.

The light beam entrance side surface of the polarization conversion unit 500 (the polarization splitting element array 510) is mounted on the bonding surfaces 611A, 612A of the bonding sections 611, 612 while guiding the vertical ends of the polarization conversion unit 500 with the guide sections 617 and the lateral ends of the polarization conversion unit 500 with the guide sections 616 to the first fixing frame 610. Subsequently, an adhesive is applied to the vertical edge sections of the polarization conversion unit 500 thus mounted and the lateral edge sections of the polarization conversion unit 500 corresponding to the guide sections 616 to fix the polarization conversion unit 500. As the adhesive, a ultra violet-curing adhesive is used in the present embodiment, and is cured by irradiated with a ultra violet beam.

Subsequently, the step of applying the silicone adhesive 640 is executed. The step of applying the silicone adhesive 640 will be explained with reference to FIG. 8.

FIG. 8 is a diagram showing a silicone adhesive 640 in assembling the polarization conversion device 50.

As shown in FIG. 8, the polarization conversion unit 500 is fixed to a predetermined position of the first fixing frame 610, and then the silicone adhesive 640 is applied to the end sections in the vertical direction (the Z direction) of the light exit side surface of the retardation plates 530. It should be noted that a predetermined amount of the silicone adhesive 640 is applied using a dispenser.

After the silicone adhesive 640 is applied, the step of fixing the second fixing frames 630 to the corresponding arms 618 of the first fixing frame 610 is executed.

Here, the configuration of the second fixing frame will be explained. As explained with reference to FIG. 5, the second fixing frames 630 are respectively disposed on both ends of the retardation plates 530 on the light beam exit side of the retardation plates 530. The second fixing frames are configured as the holding plates 631, 635 each formed to have a rectangular plate-like shape. It should be noted that the holding plate 631 is located at the upper end section of the retardation plates 530 while the holding plate 635 is located at the lower end section of the retardation plate 530, and the holding plates 631, 635 are formed to have the same shape.

Here, the holding plate 631 as the second fixing frame will be explained.

The holding plate 631 is provided with through holes 632 formed on the both ends correspondingly to the screw holes 619 provided to the arm sections 618A, 618B of the first fixing frame 610. Further, the holding plate 631 is also provided with three insertion holes 633 for guiding the protruding sections 617A so that the protruding sections 617A are inserted in the insertion holes 633 correspondingly to the protruding sections 617A of the guide section 617 of the first fixing frame 610.

It should be noted that the holding plate 635 is configured similarly to the holding plate 631 as described above, and is provided with through holes 636 corresponding to the through holes 632, and insertion holes 637 corresponding to the insertion holes 633.

Then, going back to the assembling method, the step of fixing the second fixing frames 630 to the corresponding arm sections 618 of the first fixing frame 610 after applying the silicone adhesive 640 to the retardation plates 530 will be explained.

After applying the silicone adhesive 640 to the retardation plate 530, the protruding sections 617A are inserted in the insertion holes 633 of the second fixing frame 630 (the holding plate 631) while guided by the insertion holes 633, and the holding plate 631 is mounted on the surfaces of the arm sections 618A, 618B. Thus, the through holes 632 of the holding plate 631 are automatically positioned at the positions corresponding to the screw holes 619 of the arm sections 618A, 618B. In a similar manner, the holding plate 635 is mounted on the surfaces of the arm sections 618C, 618D.

Then, by inserting the flanged screws 650 into the through holes 632 of the holding plate 631 and screw them into the screw holes 619 using a driver jig, the holding plate 631 is fixed to the arm sections 618A, 618B. In a similar manner, the holding plate 635 is fixed to the arm sections 618C, 618D.

By the holding plate 631 being fixed to the arm sections 618A, 618B, the silicone adhesive 640 applied to each of light beam exit side surfaces of the retardation plates 530 expands having contact with the corresponding surface of the holding plate 631. The same applies to the holding plate 635. In this condition, the polarization conversion device 50 is put into a drying furnace to dry the silicone adhesive 640. The dried silicone adhesive 640 becomes to have elasticity.

By the holding plates 631, 635 being fixed to the arm sections 618, it is possible to prevent the retardation plates 530 bonded to the double-sided adhesive tapes 540 from peeling, thus fixing the polarization conversion unit 500 to the first fixing frame 610.

It should be noted that the amount (the predetermined amount) of the silicone adhesive 640 to be applied is determined by an experiment to be the amount with which the silicone adhesive 640 expands having contact with the corresponding surface of the holding plates 631, 635, and within the area not contributing to the polarization conversion of the light beam entering the polarization conversion unit 500.

By executing the above steps, the polarization conversion device 50 shown in FIGS. 4 and 5 is completed.

Figure 9A:
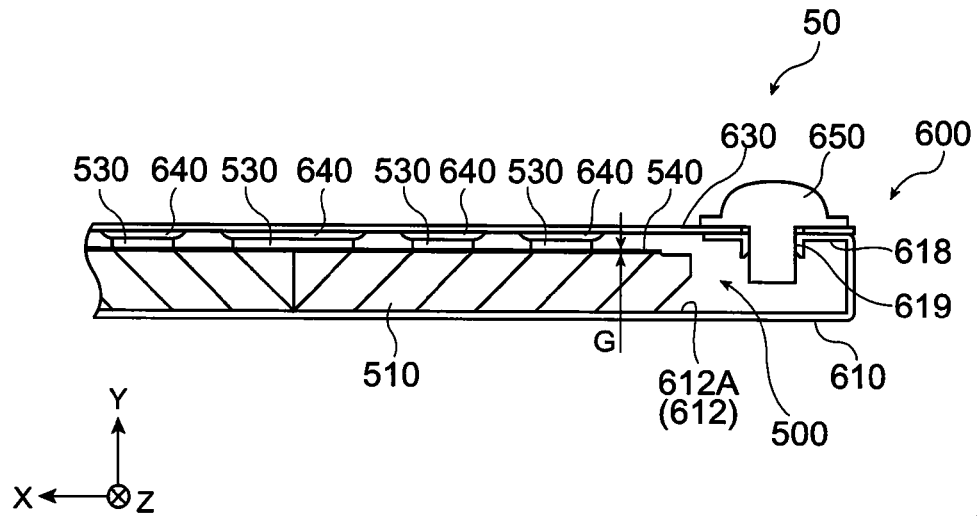
Figure 9B:
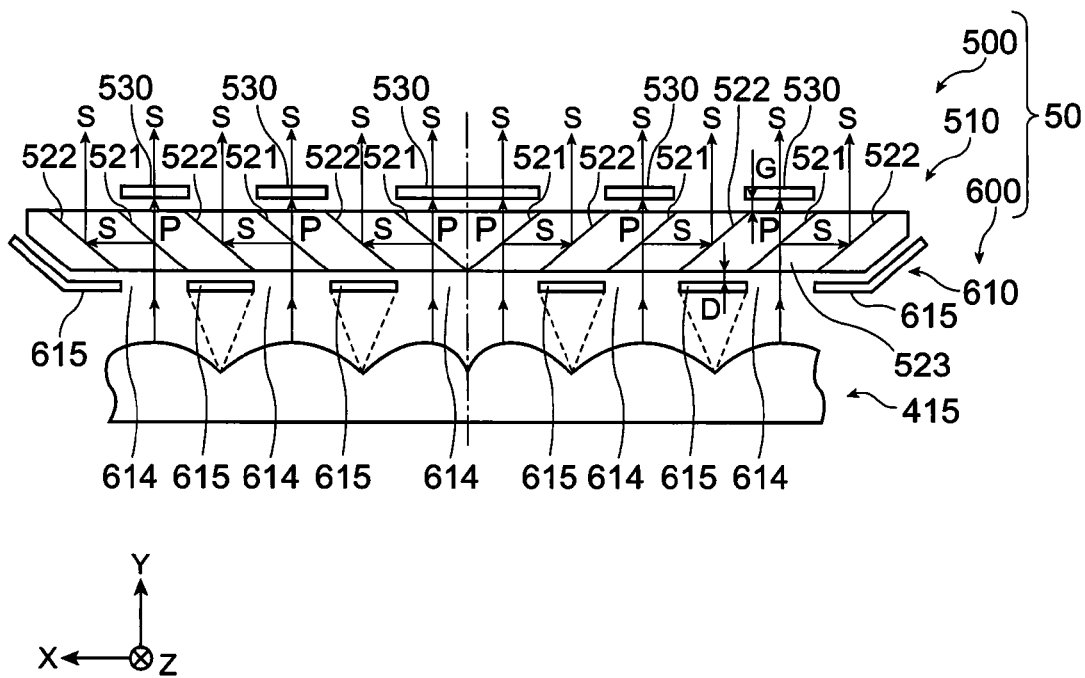

FIGS. 9A and 9B are cross-sectional views of substantial parts of the polarization conversion device, wherein FIG. 9A is a cross-sectional view along the A-A line in FIG. 5, and FIG. 9B is a cross-sectional view along the B-B line in FIG. 5. Further, FIG. 9A is specifically a cross-sectional view showing the relationship between the double-sided adhesive tape 540 and the silicone adhesive 640 in the polarization conversion device 50. Further, FIG. 9B is specifically a cross-sectional view showing the relationship between the polarization conversion unit 500 and the opening sections 614, the light blocking sections 615 in the polarization conversion device 50, and the operation of the polarization conversion device 50, and also showing partially the schematic cross-sectional view of the second lens array 415.

The relationship between the double-sided adhesive tape 540 and the silicone adhesive 640 in the polarization conversion device 50 will be explained with reference to FIG. 9A.

In the polarization conversion unit 500, the polarization splitting element arrays 510 are fixed to the first fixing frame 610 with the ultra violet-curing adhesive. Further, the retardation plates 530 of the polarization conversion unit 500 are bonded to the light beam exit side surface of the polarization splitting element array 510 via the double-sided adhesive tapes 540. Still further, the polarization conversion unit 500 is fixed to the second fixing frames 630 via the silicone adhesive 640 applied on the light beam exit side surfaces of the retardation plates 530.

It should be noted that according to design calculations and experiments conducted by the inventors it is conceivable that in order for preventing the optical defect such as an interference pattern from being caused in the projected image, in the retardation plates 530 formed of quartz crystal members, the size (defined as G) of the gap between the polarization splitting element array 510 and the retardation plates 530 is preferably in a range of $0.01 \leq G \leq 0.3$ mm, which is no smaller than the wavelength of the light beam, and with which the light beam transmitted through the polarization splitting arrays 510 is within the effective area of the retardation plates 530.

According to the structure described above, the gap (the distance) corresponding to the thickness (0.15 mm in the present embodiment) of the double-sided adhesive tapes 540 is kept between the light beam exit side surfaces of the polarization splitting element arrays 510 and the light beam entrance side surfaces of the retardation plates 530 formed of the quartz crystal member.

Further, there is provided a structure in which the retardation plates 530 are attached to the double-sided adhesive tapes 540 attached to the polarization splitting element arrays 510 to be fixed to the first fixing frame 610, and are fixed (held) by the second fixing frames 630 via the silicone adhesive. Thus, it becomes possible to fix the polarization conversion unit 500 to the first fixing frame 610 while preventing the retardation plates 530 attached to the double-sided adhesive tapes 540 from peeling therefrom. Further, even if the temperature of the polarization conversion device 50 is raised by the operation of the light source device 413 when the projector 1 is operated with the polarization conversion device 50 installed in the light guide 47, the retardation plates 530 is fixed to the stable positions since the silicone adhesive 640 having elasticity absorbs the position shift caused by the thermal expansion of the double-sided adhesive tapes 540.

It should be noted that since the gap between the polarization splitting element array 510 and the retardation plates 530 is kept in the range of $0.01 \leq G \leq 0.3$ mm also in the case in which the gap is varied by the expansion/contraction of the double-sided adhesive tapes 540, the optical defect such as the interference pattern is not caused in the projected image by the retardation plates 530 formed of the quartz crystal members. Further, in the present embodiment, the plan position shift or peeling of the retardation plates 530 are prevented by absorbing the expansion/contraction of the double-sided adhesive tapes 540 with the elastic silicone adhesive 640.

The relationship between the polarization conversion unit 500 and the opening sections 614, the light blocking sections 615 in the polarization conversion device 50, and the operation of the polarization conversion device 50 will be explained with reference to FIG. 9B.

In the case in which the polarization conversion unit 500 is fixed to the first fixing frame 610, there is formed a gap between the light beam entrance side surfaces of the polarization splitting element arrays 510 and the lower step sections 613 (in the light blocking sections 615), which are formed a step lower than the bonding sections 611, 612 in the −Y direction, corresponding to the amount of the step. In the present embodiment, the amount of the step D causing the gap is set to approximately 0.3 mm. It should be noted that by forming the gap corresponding to the amount of the step, the heat conduction to the polarization conversion unit 500 (particularly to the polarization splitting element arrays 510) is prevented even in the case in which the temperature of the first fixing frame 610 is raised by the irradiation of the light beam to the first fixing frame 610. Further, as described above, the gap (size G) between the light beam exit side surfaces of the polarization splitting element arrays 510 and the light beam entrance side surfaces of the retardation plates 530 is kept as approximately 0.15 mm.

Here, the operation of the polarization conversion device 50 will be explained.

The light beams emitted from the second lens array 415 are light beams having random polarization axes collected by the respective small lenses, and enter a predetermined area of the polarization conversion device 50. It should be noted that as described above, the light blocking sections 615 are provided to the first fixing frame 610, and block the light beams generating ineffective polarized light beams out of the light beams emitted from the second lens array 415 as illustrated with the broken lines in FIG. 9B.

The light beam entering the polarization conversion device 50 (the polarization conversion unit 500) is split into the P-polarized light beam and the S-polarized light beam by the polarization splitting films 521. Specifically, the P-polarized light beam is transmitted through the polarization splitting films 521 while the S-polarized light beam is reflected by the polarization splitting films 521 and is changed in the light path as much as approximately 90°.

The S-polarized light beam reflected by the polarization splitting film 521 is further reflected by the reflecting film 522 to be changed again in the light path as much as 90°, then proceeds in substantially the same direction as the entrance direction to the polarization conversion unit 500, and is emitted from the polarization conversion unit 500. Further, the P-polarized light beam transmitted through the polarization splitting films 521 enters the retardation plates 530 to be rotated in the polarization axis as much as 90°, thus being converted into the S-polarized light beam, and is emitted from the polarization conversion unit 500 as the S-polarized light beam. Therefore, the light beams emitted from the polarization conversion device 50 are formed as the S-polarized light beams of a substantially single type.

The following advantages can be obtained in the embodiment described above.

According to the polarization conversion unit 500 of the present embodiment, the end sections of the retardation plates 530 are bonded to the light exit side of the glass plates as the translucent members 523 forming the polarization splitting element arrays 510 via the double-sided adhesive tapes 540 having a predetermined thickness (0.15 mm thick in the present embodiment). Therefore, the gap formed to have the predetermined thickness of the double-sided adhesive tapes 540 is kept between the light beam exit side surface of the translucent members 523 (the glass plate) and the light beam entrance side surface of the retardation plates 530. Therefore, the optical defect (the damage to the optical characteristics) such that the interference pattern is projected in the projection image, which becomes to easily occur due to the microscopic gap caused when bonding the retardation plates 530 formed of the quartz crystal member, can be prevented. Thus, the polarization conversion unit 500 keeping the optical characteristics (e.g., the characteristic of converting the polarization axis of either one of the linearly-polarized light beams obtained by the splitting operation of the polarization splitting films 521 into the polarization axis of the other of the linearly-polarized light beams) the retardation plates 530 originally have is realized.

According to the polarization conversion unit 500 of the present embodiment, the double-sided adhesive tapes 540 capable of reattachment of an object (the retardation plates 530 in the present embodiment) are used. Therefore, in the case in which the positions at which the retardation plates 530 have been mounted are inappropriate in the manufacturing process for bonding the retardation plates 530 to the light exit side surfaces of the translucent members 523 (glass plates), the retardation plates 530 at the inappropriate positions can be detached from the double-sided adhesive tapes 540 and then attached at the appropriate positions, and consequently, increase in the manufacturing cast related to the reattachment can be suppressed.

According to the polarization conversion device 50 of the present embodiment, the fixing frame 600 is provided with the first fixing frame 610 and the second fixing frames 630. Further, the first fixing frame 610 is provided with a fixing section (the bonding sections 611, 612 in the present embodiment) to fix the polarization splitting element arrays 510. Further, the second fixing frames 630 fix the retardation plates 530 to the polarization splitting element arrays 510 via the elastic silicone adhesive 640 disposed on the light beam exit side of the retardation plates 530. According to this configuration, the retardation plates 530 in the polarization conversion unit 500 bonded via the double-sided adhesive tapes 540 are fixed by the second fixing frames 630 via the silicone adhesive 640. Therefore, there can be realized the polarization conversion device 50 in which the gap (size G) between the light beam exit side surfaces of the translucent members 523 and the light beam entrance side surfaces of the retardation plates 530 is fixed while being kept as an appropriate amount, and further the retardation plates 530 are fixed at the appropriate plan positions.

According to the polarization conversion device 50 of the present embodiment, since the first fixing frame 610 is provided with opening sections 614 at positions corresponding to the polarization splitting films 521, it is possible to allow the light beam generating the effective polarized light beam to enter the polarization splitting films 521 through the opening sections 614. Further, since the light blocking sections 615 are disposed at positions corresponding to the reflecting films 522, the light beam generating the ineffective polarized light beam can be blocked by the light blocking sections 615, thus the polarization conversion device 50 capable of performing the effective polarization conversion can be realized.

According to the polarization conversion device 50 of the present embodiment, the gap of approximately 0.15 mm is provided between the polarization splitting element arrays 510 and the retardation plates 530 by interposing the double-sided tapes 540 there between. Thus, the size of the gap G is set to be in the range of $0.01 \leq G \leq 0.3$ mm. According to this configuration, there is provided the appropriate gap, which is no smaller than the wavelength of the light when using the retardation plates 530 formed of the quartz crystal members, and with which the light beam transmitted through the polarization splitting element arrays 510 falls within the effective area of the retardation plates 530. Therefore, there can be realized the polarization conversion device 50 capable of preventing the damage to the optical characteristics such that it becomes easy for the defect (such as the interference pattern) in the projection image to occur, and for keeping the optical characteristics the polarization conversion unit 500 originally has.

According to the polarization conversion unit 500 of the present embodiment, since the retardation plates 530 are formed of the quartz crystal members, the thermal conductivity is raised dramatically in comparison with those using an organic member such as a polycarbonate film as the substrate of the retardation plate as in the past, thus enhancing the heat radiation property. Therefore, since the retardation plates 530 can be cooled with smaller amount of airflow compared to the past (enhancement of the cooling efficiency), deterioration of the quality of the retardation plates 530 can be suppressed. Further, since the retardation plates 530 (the polarization conversion unit 500) can be cooled with smaller amount of airflow compared to the past, it becomes possible to reduce the drive frequency of the cooling fan forming the cooling unit 3 such as the axial intake fan 33, thus the lower power consumption and the lower noise can be achieved.

According to the polarization conversion device 50 of the present embodiment, by providing the lower step sections 613 to the first fixing frame 610, the gap of approximately 0.3 mm is provided as the gap (the amount of the step) between the light beam entrance side surfaces of the polarization splitting element arrays 510 and the inside surface of the light blocking sections 615. According to this configuration, since the heat conduction to the polarization conversion unit 500 (particularly to the polarization splitting element arrays 510) can be prevented even if the temperature of the first fixing frame 610 rises in response to the irradiation of the light beam on the first fixing frame 610, the heat radiation efficiency of the polarization conversion unit 500 (the cooling efficiency) can be improved.

The projector 1 of the present embodiment is provided with the light source lamp 411, the polarization conversion device 50, the liquid crystal panels 441 as the light modulation devices for modulating the light beam emitted from the polarization conversion device 50 based on the image information, and the projection lens 46 as the projection optical device for projecting the light beam modulated by the light modulation devices. Such a projector 1 can be realized as the projector capable of preventing the optical defect to the projection image from occurring by the polarization conversion device 50 appropriately keeping the gap (the gap between the polarization splitting element arrays 510 and the retardation plates 530) between the light exit side surfaces of the translucent members 523 and the light entrance side surfaces of the retardation plates 530, and the plan positions of the retardation plates 530.

According to the polarization conversion unit 500 of the present embodiment, since the retardation plates 530 are formed of the quartz crystal members to dramatically suppress the quality deterioration of the retardation plates 530 caused by heat, longer life of the polarization conversion unit 500 (the retardation plates 530) can be achieved. Therefore, longer life of the projector 1 using such a polarization conversion unit 500 can also be achieved.

It should be noted that the embodiment describe above is not a limitation, but it is possible to put the embodiment into practice added with various modifications or improvements. Some modified examples will be described below.

Modified Example 1

In the polarization conversion unit 500 of the embodiment described above, the double-sided adhesive tapes 540 for bonding the retardation plates 530 to the polarization splitting element arrays 510 has a thickness of 0.15 mm. However, the thickness of the double-sided adhesive tapes 540 is not limited to 0.15 mm, but can be the thickness with which the size G of the gap between the polarization splitting element arrays 510 and the retardation plates 530 can be set within the range of $0.01 \leqq G \leqq 0.3$ mm in the case in which the polarization conversion unit 500 is installed in the fixing frame 600 as the polarization conversion device 50. Further, it is possible to attach a sheet or the like for providing the gap instead of the double-sided adhesive tapes 540.

Modified Example 2

In the polarization conversion unit 500 of the present embodiment described above, although the double-sided adhesive tapes 540 is configured with the adhesive force and the material capable of reattachment of the attached object, it is not a limitation, but the double-sided adhesive tapes configured with adhesive force and material not capable of reattachment of the attached object can also be adopted. In this case, although the reattachment of the retardation plate 530 becomes very difficult, by using the double-sided adhesive tapes with the predetermined thickness described above, the size of the gap between the polarization splitting element arrays 510 and the retardation plates 530 can be assured.

Modified Example 3

In the polarization conversion unit 500 of the embodiment described above, the double-sided tapes 540 for bonding the retardation plates 530 to the polarization splitting arrays 510 are attached respectively to the both of the upper end and the lower end (in the Z direction) of the polarization splitting element arrays 510 on the light beam exit side surface of the polarization splitting element arrays 510. Subsequently, the retardation plates 530 are mounted on the upper surfaces of the double-sided adhesive tapes 540 from above (in the Y direction) the double-sided adhesive tapes 540, thus attached thereto while being aligned at the positions corresponding to the respective polarization splitting films 521. However, there can also be adopted the structure in which the double-sided adhesive tapes 540 are formed as the double-sided adhesive tapes formed to have lengths suitable for respective widths of the retardation plates 530, and after attaching the double-sided adhesive tapes to the both end sections of the retardation plates 530, the retardation plates 530 are mounted on the upper surfaces of the polarization splitting element arrays 510 while aligning the retardation plates 530 with the positions respectively corresponding to the polarization splitting films 521.

Modified Example 4

In the polarization conversion device 50 of the embodiment described above, there is provided a structure in which the retardation plates 530 are attached to the double-sided adhesive tapes 540 attached to the polarization splitting element arrays 510 to be fixed to the first fixing frame 610, and are fixed by the second fixing frames 630 via the silicone adhesive 640. Here, a silicone member (silicone rubber) formed like a sheet can also be used instead of the silicone adhesive 640. In this case, there can be adopted the structure in which the sheet like silicone members are respectively mounted on the light beam exit side and at the both end sections of the retardation plates 530 forming the polarization conversion unit 500, and the retardation plates 530 are fixed by the second fixing frames 630 via the silicone members. Further, besides the silicone member, any elastic rubber members (e.g., nitrile rubber, chloroprene rubber, butyl rubber, fluorocarbon rubber, ethylene-propylene rubber) can also be used in the same manner. Further, besides the rubber members with elasticity, a member made of a urethane material with elasticity, for example, can also be used.

Modified Example 5

In the optical system of the projector 1 of the embodiment described above, although the liquid crystal panels 441 as the light modulation devices use the transmissive liquid crystal panels, reflective light modulation devices such as reflective liquid crystal panels can also be used.

Modified Example 6

In the optical system of the projector 1 of the embodiment described above, although the liquid crystal panels 441 as the light modulation devices adopt a so-called three-panel method using the three liquid crystal panels 441 (441R, 441G, and 441B), this is not a limitation, but a single panel method can also be adopted. Further, a liquid crystal panel for improving the contrast can also be adopted additionally.

Modified Example 7

Although the projector 1 of the embodiment described above applies the invention as a projector of the front type, the invention can also be applied to the rear type projector having a screen as the projection target surface integrated therein.

It should be noted that although the best mode for carrying out the invention is disclosed in the above descriptions, the invention is not limited thereto. In other words, although the invention is illustrated and described with respect mainly to a specific embodiment, those skilled in the art can apply various modifications (alterations and improvements) to the embodiment described above in the shapes, materials, quantity, and so on of the specific constituents within the scope, the spirit, the technical concepts, or the object of the invention.

Therefore, the cases in which those skilled in the art put the invention into practice with various modifications added to the embodiment in the shapes, materials, quantity, and so on of the specific constituents should fall into the scope of the invention.

The entire disclosure of Japanese Patent Application No. 2007-181784, filed Jul. 11, 2007 is expressly incorporated by reference herein.

What is claimed is:

1. A polarization conversion device, comprising:
   a polarization conversion unit, comprising:
      a polarization splitting element array including
         a plurality of polarization splitting films disposed obliquely to an incident light beam and for splitting the incident light beam into two types of linearly-polarized light beams,
         a plurality of reflecting films disposed in parallel alternately between the polarization splitting films and for reflecting either one of the linearly-polarized light beams obtained by the polarization splitting films, and
         a translucent member provided with the polarization splitting films and the reflecting films;
      a plurality of retardation plates each formed of a quartz crystal member and for converting a polarization axis of either one of the linearly-polarized light beams obtained by the polarization splitting films into a polarization axis of the other of the linearly-polarized light beams; and
      a spacer member having a predetermined thickness and for bonding end sections of the retardation plates to a light beam exit side of the translucent member; and
   a fixing frame for fixing the polarization conversion unit, wherein the fixing frame includes a first fixing frame disposed on a light beam entrance side of the polarization splitting element array, and a second fixing frame disposed on a light beam exit side of the retardation plates,
      the first fixing frame has a fixing section for fixing the polarization splitting element array, and
      the second fixing frame fixes the retardation plates to the polarization splitting element array via an elastic member.

2. The polarization conversion unit according to claim 1, wherein the spacer member is capable of reattachment of an attached object.

3. The polarization conversion device according to claim 1, wherein the first fixing frame includes
   a plurality of opening sections disposed at positions corresponding to the polarization splitting films and for allowing a light beam emitted from a light source to pass through, and
   a plurality of light blocking sections disposed at positions corresponding to the reflecting films and for blocking a part of the light beam emitted from the light source.

4. The polarization conversion device according to claim 1, wherein a size G of a gap between the polarization splitting element array and the retardation plates is in a range of $0.01 \leqq G \leqq 0.3$mm.

5. A projector comprising:
   a light source;
   the polarization conversion device according to claim 1;
   a light modulation device for modulating a light beam emitted from the polarization conversion device based on image information; and
   a projection optical device for projecting the light beam modulated by the light modulation device.

6. The projector according to claim 5, wherein the first fixing frame includes
   a plurality of opening sections disposed at positions corresponding to the polarization splitting films and for allowing a light beam emitted from a light source to pass through, and
   a plurality of light blocking sections disposed at positions corresponding to the reflecting films and for blocking a part of the light beam emitted from the light source.

7. The projector according to claim 5, wherein a size G of a gap between the polarization splitting element array and the retardation plates is in a range of $0.01 \leqq G \leqq 0.3$mm.

8. A polarization conversion unit, comprising:
   a polarization splitting element array including
      a plurality of polarization splitting films disposed obliquely to an incident light beam and for splitting the incident light beam into two types of linearly-polarized light beams,
      a plurality of reflecting films disposed in parallel alternately between the polarization splitting films and for reflecting either one of the linearly-polarized light beams obtained by the polarization splitting films, and
      a translucent member provided with the polarization splitting films and the reflecting films;
   a plurality of retardation plates each formed of a quartz crystal member and for converting a polarization axis of either one of the linearly-polarized light beams obtained by the polarization splitting films into a polarization axis of the other of the linearly-polarized light beams; and
   a spacer member having a predetermined thickness and for bonding end sections of the retardation plates to a light beam exit side of the translucent member,
   wherein a size G of a gap between the polarization splitting element array and the retardation plates is in a range of $0.01 \leqq G \leqq 0.3$mm.

* * * * *